Oct. 1, 1957 K. J. AVERSTEN Re. 24,367

ELECTRIC WELDING AND SOLDERING GUN

Original Filed Nov. 26, 1951 3 Sheets-Sheet 1

INVENTOR
K.J. Aversten
BY
Robert B Pearson
ATTORNEY

ELECTRIC WELDING AND SOLDERING GUN

Original Filed Nov. 26, 1951 3 Sheets-Sheet 2

INVENTOR
K.J. Aversten
BY
Robert B Pearson
ATTORNEY

ELECTRIC WELDING AND SOLDERING GUN

Original Filed Nov. 26, 1951 3 Sheets-Sheet 3

INVENTOR
K.J. Aversten
BY
Robert B Pearson
ATTORNEY

United States Patent Office

Re. 24,367
Reissued Oct. 1, 1957

24,367

ELECTRIC WELDING AND SOLDERING GUN

Karl Joel Aversten, Lidingo, Sweden, assignor to Svenska Aktiebolaget Gasaccumulator, Lidingo, near Stockholm, Sweden, a corporation of Sweden Original No. 2,712,049, dated June 28, 1955, Serial No. 258,239, November 26, 1951. Application for reissue July 17, 1956, Serial No. 598,489

13 Claims. (Cl. 219—98)

Matter enclosed in heavy brackets [ ] appears in the original patent but forms no part of this reissue specification; matter printed in italics indicates the additions made by reissue.

The present invention refers to an electric welding and soldering gun for attaching rod-shaped members by welding or soldering to a metallic base or workpiece, the welding current being made to pass through the member and melting one end thereof, which is then pressed against the base and allowed to solidify in order to provide a fast joint between the member and the base. The current is applied only during a relatively short interval and a time control is therefore required for breaking the current. It has heretofore been the usual practice to include in the time control an auxiliary circuit associated with the gun. This circuit was adapted to operate a relay for making or breaking a separate welding circuit comprising the member to be attached, which was held by the gun. The time control arrangement with its various parts and the associated welding circuit switch were therefore so bulky that they had to be made up into a separate unit apart from the welding gun and merely connected with it through the necessary conductors.

In accordance with the present invention, however, the gun is integral with a time control arrangement adapted to control the duration of the welding or soldering process, whereby the gun is made less bulky and easier to transport and the construction as a whole is improved from several aspects. Furthermore, in accordance with an embodiment of the invention, the time control arrangement comprises switching means for initiating and maintaining a supply of current to the member to be welded and separate current breaking means for breaking the current. In accordance with a further embodiment of the invention, the current breaking means comprises a fuse wire, the dimensions of which are selected with regard to the amount of energy to be supplied during the welding process in such a manner that the wire breaks the current by fusing when the said energy has been supplied. Moreover, in accordance with an embodiment of the invention, the gun housing is of at least approximately cylindrical cross-section along the whole of its length. The housing preferably comprises a pair of sections mutually turnable about the longitudinal axis thereof, so as to make possible the preparation of the timing arrangement for a subsequent weld simply by the turning of one section with respect to the other.

Figure 1:
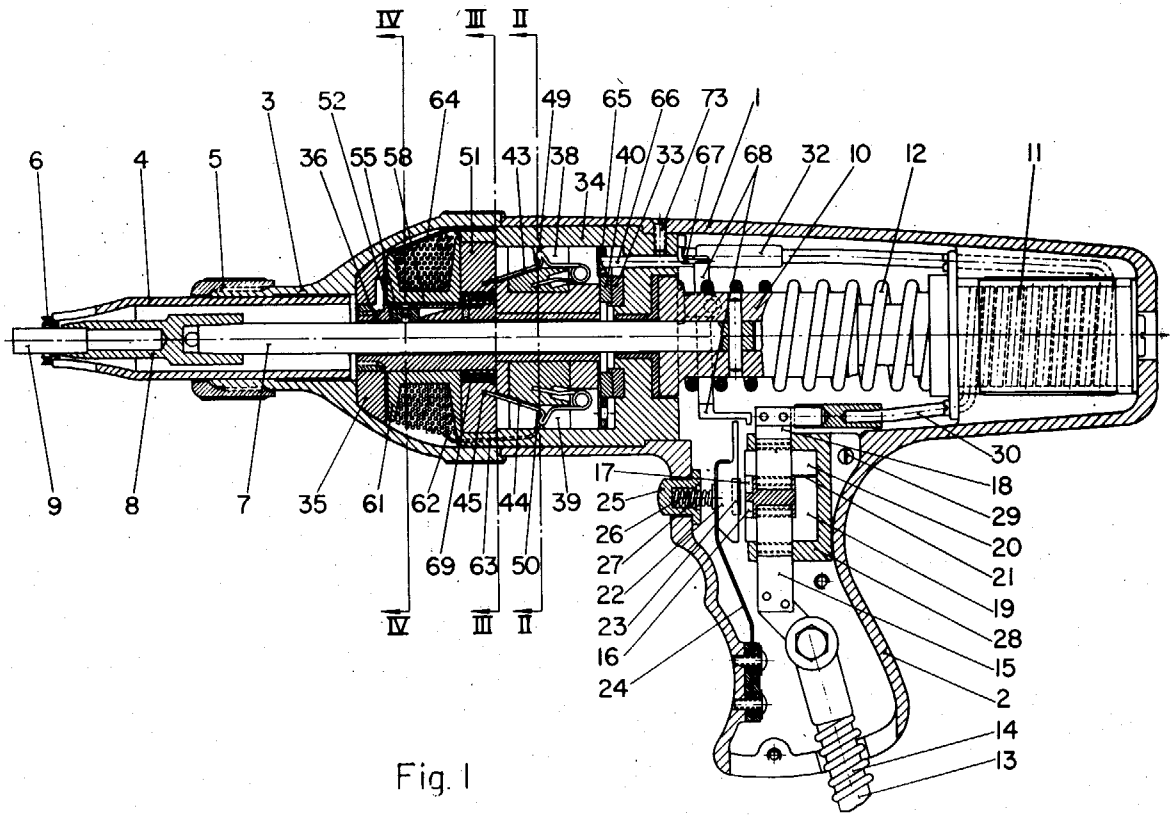
Figure 2:
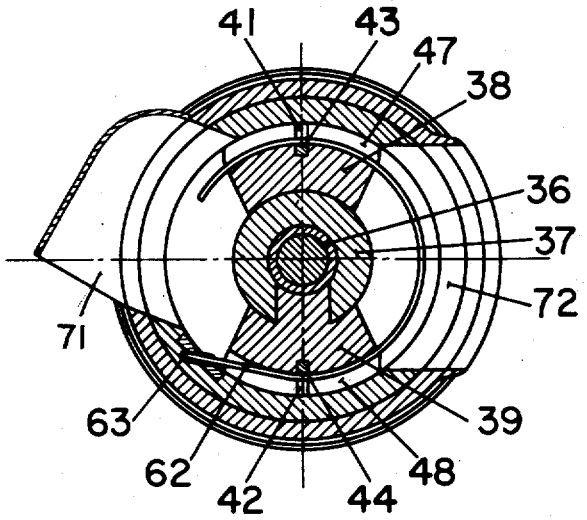
Figure 3:
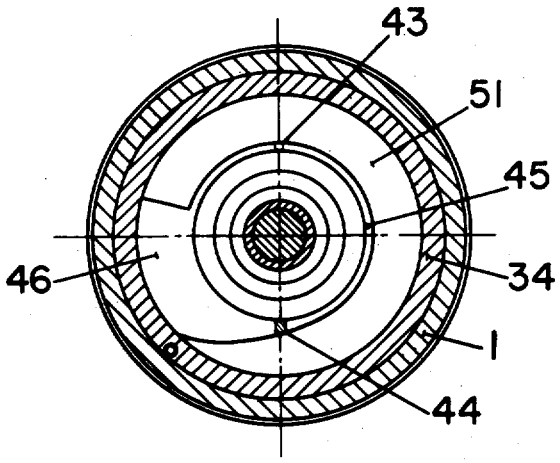
Figure 4:
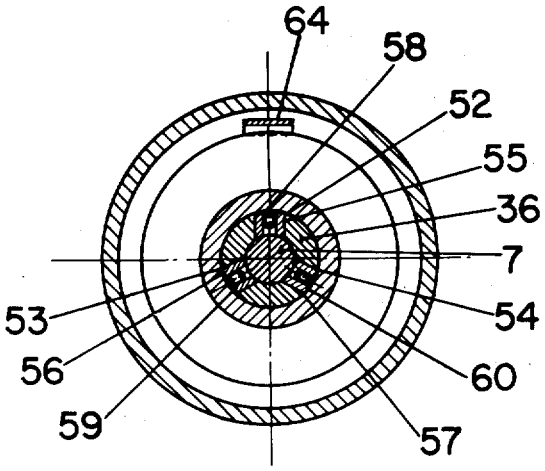
Figure 5:
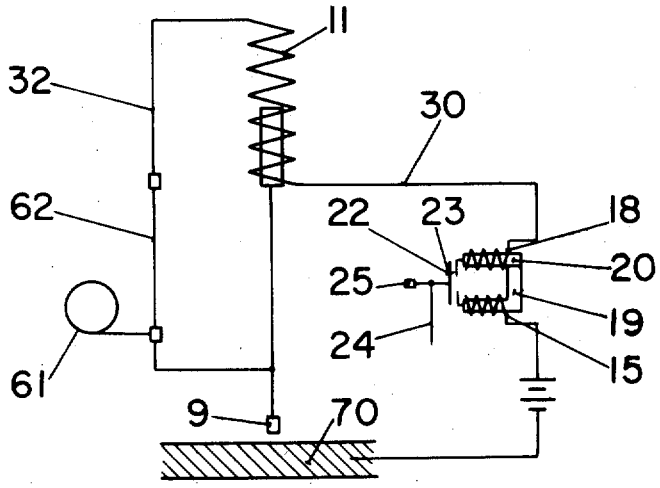

The invention is illustrated in the form of an embodiment shown by way of example on the annexed drawings. Fig. 1 is a longitudinal section of a welding and soldering gun according to the invention. Figs. 2, 3 and 4 are cross-sections along the respective lines II, III and IV of Fig. 1. Fig. 5 is a circuit diagram.

The welding and soldering gun comprises a housing having a larger section 1 with a handle 2 and a smaller section or cap 3. Sections 1 and 3 are of circular cross-section along the whole length thereof, except for the handle 2. The cap or section 3 is turnable with respect to section 1 about the common longitudinal axis of the sections. Within cap 3 a supporting sleeve 4 is adjustable axially to different positions and may be locked in position with a nut 5. The external end of the sleeve 4 carries a porcelain collar 6. Centrally disposed within the sleeve 4 without making contact with it is an axle 7 with a chuck 8 attached thereto and a stud 9 to be welded or soldered shown gripped by the chuck. The axle 7 is mounted in an extension 10, the unit thus formed being slidable within certain limits into the gun under the influence of an electromagnet 11 and outwardly under the influence of a spring 12.

An electric cable 13 is connected with the handle 2 for supplying the current and is provided with a helical spring 14 to guard against excessive strain due to bending at the handle 2. Within the handle 2, one side of which forms a removable lid, not shown, the cable 13 is continued by a spirally wound copper ribbon 15, the innermost end of which is joined to a silver contact 16. A similar contact 17 is attached at the inner end to a spirally wound copper ribbon 18. Extending through the spirals of ribbons 15 and 18 and abutting each to one of contacts 16 and 17 there are provided a pair of iron cores 19 and 20, which jointly are in the shape of a horseshoe but are insulated electrically by an insulating layer 21. An iron anchor 22 having an inlaid silver plate 23 is disposed opposite the free ends of the cores 19 and 20 and is supported in spaced relation to the ends by means of a flat spring 24. The anchor 22 and the silver plate 23 thus combine to form a unit, which will hereinafter be termed the contact member. A push button 25 is adapted, when pressed, to make the contact member 22, 23 abut contacts 16 and 17, this action taking place by means of a helical spring 26, guided by a short guide pin 27. Elements 15 to 27 together form a switch, the elements 15 to 21 of which are embedded in an insulating body 28, composed of Bakelite and fastened with a screw 29.

The copper ribbon spiral 18 is connected by means of a conductor 30 to the electromagnet winding 11, which is in turn continued by a conductor 32 up to a metal ring 33. The ring 33 is fast in an insulating body 34, which is in its turn fastened with screws 73 in section 1.

A ring 35 of insulating material is fastened in the cap 3, the central portion of the ring being threaded on to a metallic sleeve 36, in which the axle 7 is journalled. The sleeve 36 supports a hub 37 composed of insulating material. Attached to hub 37 are a pair of conductive jaws 38 and 39, the one of which 38 is electrically connected by means of a metal ring 40 with the ring 33 but insulated from the sleeve 36, whereas the other jaw 39 is insulated from the ring 33 but electrically connected with the sleeve 36. Each of the jaws 38 and 39 has provided therein an axial slot 41 or 42, respectively, each slot accommodating a spring clip 43 or 44, respectively. One end of each of the clips 43 and 44 extends into a groove 45 having a radially expanded portion 46. The groove 45 is provided in a wall portion 51 of the insulating body 34, as is apparent from Fig. 3. In the middle of the outer surface of each of the jaws 38 and 39 is a peripheral groove 47 or 48, respectively, which reaches almost to the bottom of the corresponding one of the slots 41 and 42. At the points corresponding to the grooves 47 and 48 the clips 43 and 44 are bent to form a pair of projections 49 and 50. Moreover, the construction and mode of fastening of the spring clips is such as to make them bend to snap outwards.

Three recesses 52, 53 and 54 are provided in the sleeve 36, each of which accommodates a contact shoe 55, 56 or 57, respectively. The shoes are connected through spring straps 58, 59 or 60, respectively, with the sleeve 36 and make contact with the axle 7.

A reel 61 of electrically nonconductive material is disposed around the sleeve 36. A copper or aluminum wire 62 is wound on the reel and runs through a groove 63 in the body 34 to the jaws 38 and 39 into the peripheral grooves 47 and 48 thereof, where it is held clamped by the projections 49 and 50 of the clips 43 and 44. A spring 64 serves as a brake for the reel by pressing against one of its flanges.

A ring 65 is fastened to the hub 37 and possesses a hole, into which a rod 66 can be extended under the influence of a spring 67. The rod 66 is connected with a pivoted catch 68, which is adapted in one of its end positions to lock the contact member 22, 23 and in its other end position to be swung clear thereof.

A helical spring 69 is disposed between the wall portion 51 and a flange of the sleeve 36 and strives to push the latter into the gun so as to make the ring 40 abut firmly against the ring 33. The spring 69 as well as the fact that the jaws 38 and 39 are guided axially in the insulating body 34 or its wall portion 51 ensures a firm contact in the axial direction between the cap 3 and the section 1.

In the circuit diagram of Fig. 5 the component electric elements of the device have the same designations as the corresponding details of Figs. 1 to 4, so that it will suffice to mention that the reference number 70 designates a workpiece, to which it is desired to attach the pin 9 by soldering.

The operation of the device is as follows:

The gun is approached to the work until there is contact between the stud 9 and the work. By pressing of the gun against the work, the chuck 8, the axle 7 and the extension 10 with the supporting sleeve 4 are pushed inward against the action of the spring 12 until the porcelain collar 6 will also abut against the work.

The button 25 is now pressed and the spring 26 will exert pressure on the contact member 22, 23, making the silver plate 23 thereof close the circuit comprising the contacts 16 and 17 of the switch 15 to 27. The current, which is supplied through the cable 13, flows through the ribbons 15 and 18, whereby the iron cores 19 and 20 are magnetized and attract the contact member 22, 23. Once the circuit is closed, the connection between the silver plate 23 and the silver contacts cannot be broken until the current is interrupted by some other means than the switch.

The current flows through the conductor to the electromagnet 11 and on through the conductor 32 to the ring 33, through which it passes to the ring 40 fastened on the jaw 38. The contact between the rings 33 and 40 is established owing to the fact that the spring 69 continuously holds the sleeve 36 with the members attached thereto pressed against the ring 33.

The current then flows from the jaw 38 through the wire 62 to the jaw 39, then on to the sleeve 36 and through the straps 58 to 60 and the contact shoes 55 to 57 into the axle 7, and from there via the chuck 8 to the stud 9, so that an arc is formed between the stud 9 and the work. This is due to the fact that the electromagnet 11 attracts the extension 10 by a predetermined short distance. At the same time the axle 7, the chuck 8 and the stud 9 are also drawn into the gun, whereby the stud is lifted a short distance away from the work, against which the gun is resting with its porcelain collar 6. The arrangement for ensuring that the length of the arc will always have the correct value is immaterial to the present invention.

The electric current which flows from the electromagnet 11 to the jaw 38 passes through the wire 62 to the jaw 39, as was indicated above. The current, being of large amperage relative to the area of the wire 62, fuses the wire after a very short time. This breaks the current and interrupts the welding process. The breaking of the current removes the magnetic force of the electromagnet 11 and the attraction that was exerted on the extension 10, which is then pushed down towards the insulating body 34 by the heavy spring. At the same time the axle 7, the chuck 8 and the stud 9 are also pushed downward and the outer end of the stud is pressed into the molten pool on the work and is firmly attached to the work through the soldering process, since the pool immediately solidifies.

Immediately upon the breaking of the current the iron cores 19 and 20 lose their magnetism and release the contact member 22, 23. If the operator should attempt to start another welding process by pressing the button 25 nothing will happen, since the wire 62 is ruptured. A fresh portion of wire must first be reeled off the reel 61 and fed forward between the jaws 38 and 39. This is done by turning the cap 3 counter-clockwise as viewed in Fig. 2 and together with it also the sleeve 36 and the jaws 38 and 39 attached thereto. The free end of the clip 43 accommodated in the jaw 38 will then snap outwards when the groove 45, in which the end is guided, suddenly expands at 46. By this centrifugal snap action the bit of wire remaining in the jaw 38 is thrown out through an opening 71 left in the housing and the insulating body 34. During this turning of the cap the hole in the ring 65 has been removed from the rod 66, the end of which has slid on to the side face of the ring. The rod is thus pushed to the right as viewed in Fig. 1 and the catch 68 is swung into engagement with the contact member 22, 23, thus preventing the latter from making contact with the silver contacts 16 and 17. A pressure on the button 25 will then only compress the spring 26. Upon continued turning of the jaw 38 a fresh bit of wire will be guided into the groove 47 and be clamped down by the clip 43 as the end thereof located in the groove 45, 46 is brought towards the centre. The other jaw 39 has at the same time been holding the wire 62 with the clip 44. When the cap has made one half of a complete turn the jaws 38 and 39 will therefore have interchanged their positions with regard to Fig. 2 and the wire will be taut, as shown in the figure. At the same time the rod 66 snaps into a hole in the ring 65, whereby the operator's attention is drawn to the fact that the turn is completed. Simultaneously, the rod 66 swings the catch 68 clear of the contact member 22, 23 and another welding or soldering operation may be performed by the pressing of the button 25.

The sputter occasioned by the fusion of the wire 62 is free to escape by an opening 72 diametrically opposed to the opening 71.

Different dimensions of the stud 9 require different values of the current and of the welding time. The required variation is provided by suitable choice of the gauge of the wire 62 in accordance with the dimensions of the stud. Ordinarily, however, it has been found possible to weld or solder two or three approximately similar dimensions with one and the same gauge. For example, studs of 9 to 12 mms. can be welded or soldered with a copper wire of 1.1 mm. A swift exchange of the reel 61 may be effected by unscrewing the cap 3 from the threaded portion of the sleeve 36.

Since a fuse wire is used for breaking the current in the manner described, the switch 15 to 27 merely serves for making the circuit and may therefore be of light construction in spite of the fact that the entire welding current is made to pass through it. This makes it possible to accommodate the switch in the gun handle.

*It can be readily appreciated that the present invention provides a means whereby the stud is maintained a predetermined distance from the workpiece for the length of time required to melt the fuse wire. The carrier or chuck 8 is urged by the spring 12 to move the stud or member 9 towards the workpiece and the electromagnet prevents this movement until the current is withdrawn by melting of the fuse wire. The fuse wire thus comprises a current flow responsive device controlling the spring means urging the carrier to move the stud or member towards the workpiece.*

The invention is not to be regarded as limited to the embodiment described and illustrated, which may be modified within the scope of the invention. The detailed construction of the time control arrangement and the switch may be varied. The time control arrangement as well as the switch may be of entirely different construction as long as their dimensions are small enough to allow them to be integral with the gun.

What I claim is:

1. In an electric welding gun for welding a rod-shaped member to a base, a time control arrangement mounted integral with said gun comprising, a welding circuit, a supply of fusible wire dimensioned to melt when the energy required for the welding process has been supplied, jaws for removably connecting an end portion of said wire in series with said welding circuit, said jaws having means for expelling the end portion of said wire after melting and inserting a fresh end portion in said jaws and separate switch means connected in series with said welding circuit for initiating the welding operation, said time control arrangement being disposed within the gun housing.

2. An arrangement as claimed in claim 1 in which the fuse wire is wound on a reel which is disposed substantially around the longitudinal axis of the gun.

3. An arrangement as claimed in claim 1 in which the pair of jaws adapted to hold the fuse wire are disposed within the housing in mutually spaced relation so as to be jointly turnable around the longitudinal axis of the housing.

4. An arrangement as claimed in claim 1 in which the jaws are provided with peripheral grooves for the fuse wire, a pair of spring clips being disposed at right angles to the grooves and including a pair of projections adapted to clamp the fuse wire to the jaws.

5. An arrangement as claimed in claim 4 in which each of the said spring clips has a free end normally urged outwardly extending into a guide groove provided in an element that is nonturnable relative to the jaws, the guide groove having a cam surface retaining said clips in clamped position during the major part of one revolution of the jaws around the longitudinal axis of the gun whereas during the remaining part of the revolution the groove releases said clips to eject a section of fuse wire from a jaw.

6. An arrangement as claimed in claim 1, a contact ring electrically connected to said switch means, one of said jaws being electrically connected with said contact ring, the other jaw being continuously in electrical connection with the rod-shaped member.

7. An arrangement according to claim 6, a chuck for holding said rod-shaped member, an axle carrying said chuck, a sleeve surrounding said axle and electrically connected to said other jaw, and contact shoes electrically connecting said sleeve to said axle.

8. An arrangement as claimed in claim 1 in which the gun has a housing comprising a pair of coaxial sections relatively turnable about the common longitudinal axis of the housing, said jaws being mounted in diametrically opposite relation in one said section, said supply of said wire being mounted in other said section, and means for operating said expelling and inserting means upon relative rotation of said members.

9. An arrangement as claimed in claim 1, in which the switching means comprises an electromagnet winding connected in series with the fuse wire and adapted, when energized by a flow of welding or soldering current therethrough, to cause the switching means to maintain a closed circuit for said current.

*10. A device for melting the end portion of a member and urging the member against a workpiece comprising, means for supporting the member, spring means for urging the supporting means to a predetermined position with respect to said device, solenoid means operatively associated with said supporting means, a fuse, an electrical circuit including said solenoid, said fuse, the member and workpiece, whereby current flow actuates said solenoid to move said supporting means to a position wherein the member and workpiece are spaced and fusing of the fuse causes said spring means to urge the member into contact with the workpiece.*

*11. A gun for melting an end portion of a member and urging the member toward a workpiece, said gun comprising, means for supporting said member, means urging said supporting means and said member toward a workpiece, means for drawing said supporting means and member away from the workpiece in opposition to said urging means, and a current flow responsive device for controlling said last-named means.*

*12. A gun for melting an end portion of a member and urging the member toward a workpiece, said gun comprising, means for supporting said member, means urging said supporting means and said member toward a workpiece, means for drawing said supporting means and member away from the workpiece in opposition to said urging means and a fuze in electrical connection with said member and said workpiece, current flow through said fuze actuating said last-named means.*

*13. A gun for electrically melting an end portion of a rod-shaped member and urging the member toward a workpiece, said gun comprising a housing, supporting means movable relatively to said housing for holding the member, means urging said supporting means to move relatively to said housing and to move said member towards a workpiece and means in said housing for drawing said supporting means and member away from the workpiece in opposition to said urging means, and a current flow responsive device arranged inside said housing behind said member for controlling the interruption of the welding current supply to said member to render said last-named means inoperative, said current flow responsive device being in electrical connection with said member and said workpiece.*

References Cited in the file of this patent or the original patent

UNITED STATES PATENTS

| | | |
|---|---|---|
| 1,523,667 | Steele et al. | Jan. 20, 1925 |
| 1,608,825 | Wagner et al. | Nov. 30, 1926 |
| 1,684,108 | Phelps | Sept. 11, 1928 |
| 2,265,169 | Hughes et al. | Dec. 9, 1941 |
| 2,442,449 | Zimmerman | June 1, 1948 |
| 2,451,152 | Candy | Oct. 12, 1948 |
| 2,451,190 | Anderson | Oct. 12, 1948 |
| 2,474,531 | Keir et al. | June 28, 1949 |

FOREIGN PATENTS

| | | |
|---|---|---|
| 450,939 | Great Britain | July 24, 1936 |